United States Patent [19]
Prust et al.

[11] Patent Number: 6,031,204
[45] Date of Patent: Feb. 29, 2000

[54] DROP-IN AIR HEATER FOR AN ENGINE WITH HEATER SUPPORT FRAME HAVING PRONGS

[75] Inventors: Andrew J. Prust, Coon Rapids; Jan P. Thimmesch, Eden Prairie, both of Minn.

[73] Assignee: Phillips & Temro Industries Inc., Eden Prairie, Minn.

[21] Appl. No.: 09/209,388

[22] Filed: Dec. 10, 1998

[51] Int. Cl.[7] .................................................. B60L 1/02
[52] U.S. Cl. ........................ 219/206; 219/536; 219/537; 123/549
[58] Field of Search ................................ 219/206, 536, 219/537, 523, 532, 520; 123/549; 392/350, 371, 379, 485

[56] References Cited

U.S. PATENT DOCUMENTS

| | | | |
|---|---|---|---|
| 533,795 | 2/1895 | Edwards | 219/532 |
| 1,336,559 | 4/1920 | Gutzwiller | 219/532 |
| 2,177,840 | 10/1939 | Roualet . | |
| 2,320,528 | 6/1943 | Loeffler et al. | 219/206 |
| 3,811,031 | 5/1974 | McBride et al. | 392/350 |
| 3,851,147 | 11/1974 | Hachmeister | 392/350 |
| 4,463,721 | 8/1984 | Hayashi et al. . | |
| 4,512,322 | 4/1985 | Barcy | 123/549 |
| 4,685,437 | 8/1987 | Tanaka et al. . | |
| 5,595,164 | 1/1997 | Thimmesch . | |
| 5,743,242 | 4/1998 | Thimmesch . | |
| 5,887,575 | 3/1999 | Thimmesch et al. | 123/549 |

FOREIGN PATENT DOCUMENTS

| | | |
|---|---|---|
| 62-91649 | 4/1987 | Japan . |
| 7-217508 | 8/1995 | Japan . |
| 2067245 | 7/1981 | United Kingdom . |

*Primary Examiner*—John A. Jeffery
*Attorney, Agent, or Firm*—Harness, Dickey & Pierce, P.L.C.

[57] ABSTRACT

A heater for an internal combustion engine includes a first holder, a second holder and a heating element positioned between the first and second holders. The heater further includes a frame defining a channel. The frame includes a plurality of prongs extending inwardly toward the channel that retain the holders in a first direction relative to the frame.

15 Claims, 6 Drawing Sheets

DROP-IN AIR HEATER FOR AN ENGINE WITH HEATER SUPPORT FRAME HAVING PRONGS

BACKGROUND OF THE INVENTION

1. Technical Field

The invention generally relates to an apparatus for heating the air/fuel mixture entering the cylinders of an internal combustion engine. More particularly, the invention relates to an electric heater adapted for mounting within the air intake system of an engine.

2. Discussion

The air/fuel mixture entering the cylinders of an internal combustion engine is commonly heated to increase fuel economy and responsiveness to starting as well as to decrease pollutant discharge. One type of intake heating device generally includes a housing or frame disposed between a carburetor and an air intake manifold. Another type of intake heating device is mounted within an open cavity of an intake manifold. After this second type of heating device is mounted on the intake, the heater and intake subassembly is subsequently mounted to an engine. In the aforementioned devices, current is passed through a heating coil or grid to increase the temperature of the surrounding air as it passes into a combustion chamber.

While the aforementioned heaters generally address cold starting and fuel economy issues, other concerns remain. For example, access to the prior art heaters is obtained only after the intake manifold is removed from the engine. Retrofitting an existing vehicle not originally equipped with a heater is similarly difficult. In addition, prior art heaters have been specifically constructed to package within a given geometry and function only with a certain power system. As a result, many heater components were proliferated in order to meet varying customer needs.

Accordingly, in view of the above concerns as well as the manufacturer's ever present desire to reduce manufacturing costs and complexity, a need exists for a drop-in heater that may be installed without removing the intake manifold. Similarly, a need exists for an intake heater that may be easily modified to function with different power systems.

SUMMARY OF THE INVENTION

A heater including a first holder, a second holder and a heating element positioned between the first and second holders is disclosed. The heater further includes a frame defining a channel. The frame includes a plurality of prongs extending inwardly toward the channel that retain the holders in a first direction relative to the frame.

BRIEF DESCRIPTION OF THE DRAWINGS

Other objects and advantages of the invention will become apparent to one skilled in the art upon reading the following specification and subjoined claims and upon reference to the drawings in which:

DETAILED DESCRIPTION OF THE PREFERRED EMBODIMENTS

The application described and illustrated herein is directed to an air heating device for use in an internal combustion engine. More particularly, the heating device includes a housing assembly that retains a heating element and heating element holders in a predetermined position relative to the housing. The housing includes retention tabs on a U-shaped bracket that are positioned both radial to the airflow as well as on both sides of the bracket to retain ceramic elements of the holder. The air heater and housing device provide numerous advantages over heaters known in the art including the ability to provide twelve or twenty-four volt embodiments of the invention with only minor hardware changes, taking advantage of the intake housing to secure the resistance ribbon and holders in place on the intake side of the heater element, use of retention tabs on the engine side and radial to the airflow for secure yet simple retention of the heating element and holders within the housing, and use of a mounting plate to seal the insertion area of the intake system.

In addition to the above advantages, the present invention provides an air heater that is integratable into the air intake system of a diesel engine and, more particularly, within a ninety degree (90°) elbow of the air intake tube. This unique configuration of the air heater, including the heater housing, provides enhanced startability of the diesel engine notwithstanding the restrictive location for the heater. The design also provides improved mounting flexibility over traditional bolt-on heater designs.

The drop-in air heater of the present invention will now be described in greater detail with reference to FIGS. 1–4. Specifically, as shown in FIGS. 1–4, drop-in heater 10 includes a mounting flange 16 which is connectable to an air intake tube 13 (FIG. 4) of the vehicle engine such as through apertures 17 formed therein. As will be described in detail below, mounting flange 16 further serves to seal the engine intake passage from the environment surrounding the engine compartment.

Figure 1:
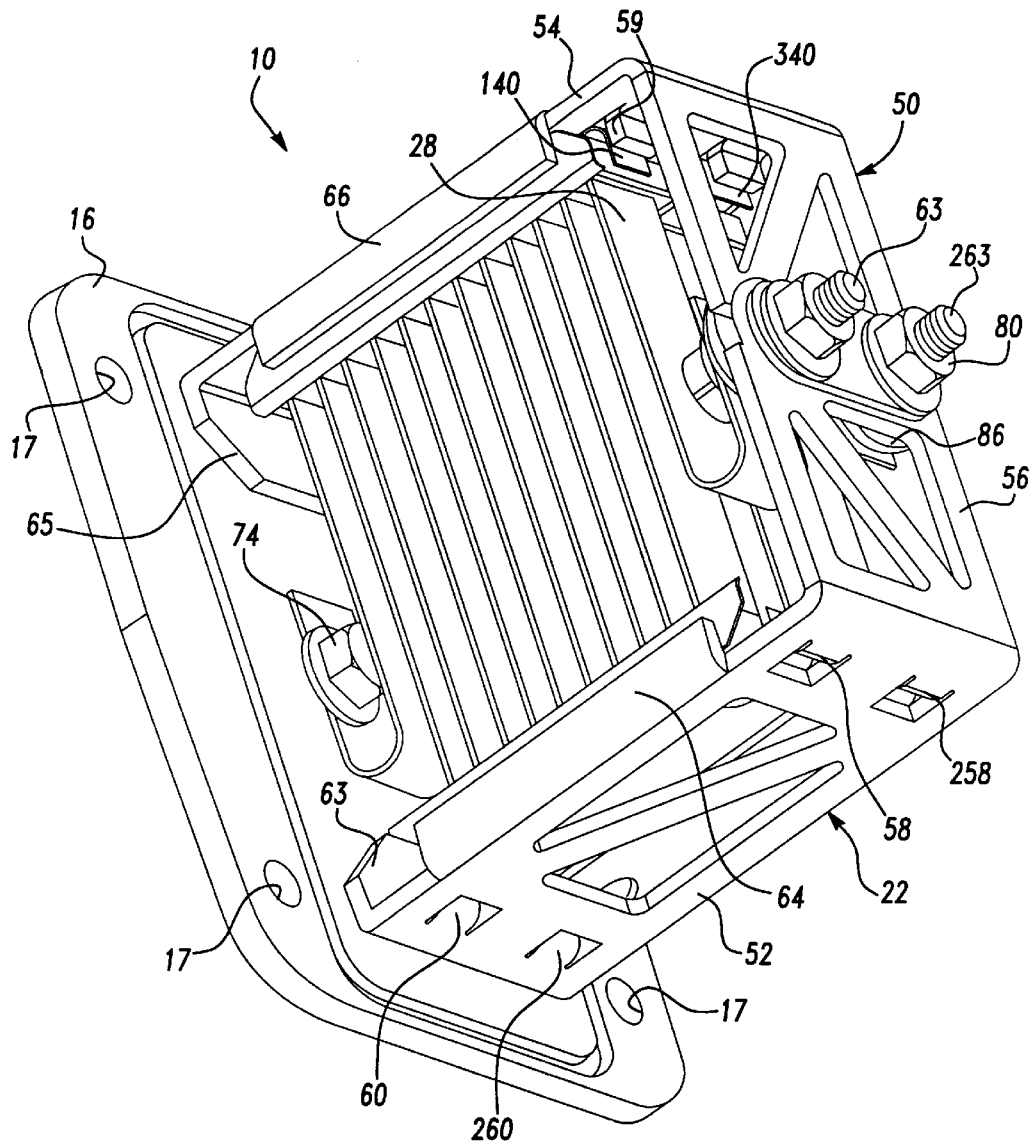
FIG. 1 is a perspective view of a drop-in heater of the present invention.
Figure 2:
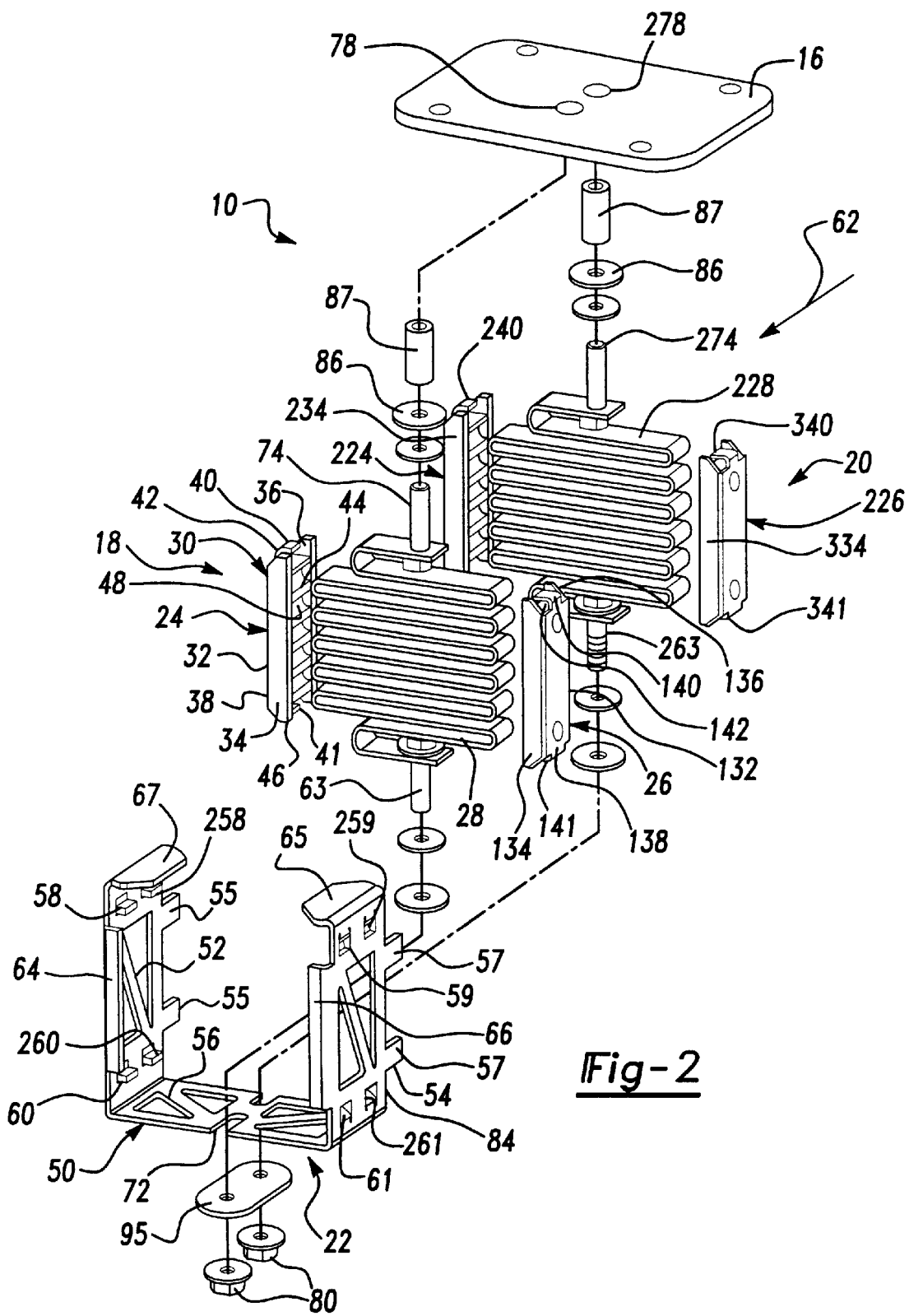
FIG. 2 is an exploded perspective view of the drop-in heater.

As best illustrated in FIGS. 1 and 2, heater 10 further includes a first heater module 18, a second heater module 20, and a U-shaped frame 22. First heater module 18 includes a first holder 24, a second holder 26, and a serpentine heating element 28. First holder 24 includes a housing 30 preferably shaped from a stainless steel sheet. Housing 30 defines a "C" shaped channel 32 bounded on three sides by opposed side walls 34 and 36 and end wall 38. Housing 30 includes tabs 40 and 41 protruding from the terminal ends of end wall 38.

Wave springs 42, also preferably formed of stainless steel, are disposable within channel 32 to engage end wall 38. Thermal and electric insulators 44 are disposable within channel 32 to engage and capture springs 42 between end wall 38 and insulators 44. Those skilled in the art will appreciate that wave springs 42 urge insulators 44 away from end wall 38 and into engagement with stops 46 which extend inwardly into channel 32 from side walls 34 and 36. Insulators 44 include cavities 48 to accommodate and position heating element 28 therewithin. It is contemplated that insulators 44 may be formed of a ceramic material known in the art to provide the desired thermal and electrical insulating properties.

As shown in FIGS. 1 and 2, second holder 26 is configured substantially the same as first holder 24. Those skilled in the art will appreciate that the configuration and interrelation of side walls 134 and 136, channel 132, tabs 140 and 141, wave springs 142, insulators 144, stops 146, and cavities 148, are substantially the same as the corresponding components described with reference to FIG. 2.

As shown in FIG. 2, second heater module 20 is configured substantially the same as first heater module 18. Accordingly, the components of second heater module 20 are referred to herein by numerals increased by 200 relative to the numbers used to describe first heater module 18.

Figure 2A:
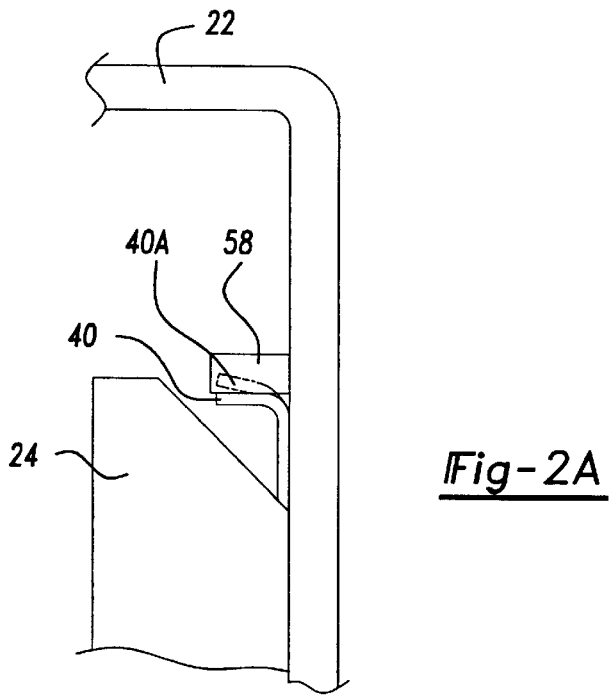
FIG. 2A is a partial perspective view of the drop-in heater.

Frame 22 defines a "U" shaped channel 50 bounded on three sides by upright walls 52 and 54 and bottom 56. Upright wall 52 includes inwardly protruding prongs 58, 60, 258 and 260, finger 67, tangs 55, and stop 64 while upright wall 54 includes inwardly protruding prongs 59, 61, 259 and 261, finger 65, tangs 57, and stop 66. Upon installation of first heater module 18 into frame 22, tabs 40 and 41 of first holder 24 cooperate with prongs 58 and 60 to securely retain first holder 24 between prongs 58 and 60. Specifically, tabs 40 and 41 are biasedly deformed to engage prongs 58 and 60 such that first holder 24 is forced toward second holder 26. In FIG. 2A, tab 40 is shown biasedly loaded against prong 58. A broken line representation of tab 40 is also presented as 40A to depict the position of the tab 40 prior to engage with the prong 58. Similarly, tabs 140 and 141 of second holder 26 are biasedly deformed to engage prongs 59 and 61 as illustrated in FIG. 1. Accordingly, the bias force generated by tabs 40, 41, 140 and 141 is counteracted by the urging of wave springs 42 and 142 such that first heater module 18 is secured in a direction radial to the direction of air flow 62. Those skilled in the art will appreciate that tabs 240 and 241 similarly cooperate with prongs 258 and 260, respectively, while tabs 340 and 341 cooperate with prongs 259 and 261, coupling each holder of second heater module 20 to frame 22.

Figure 4:
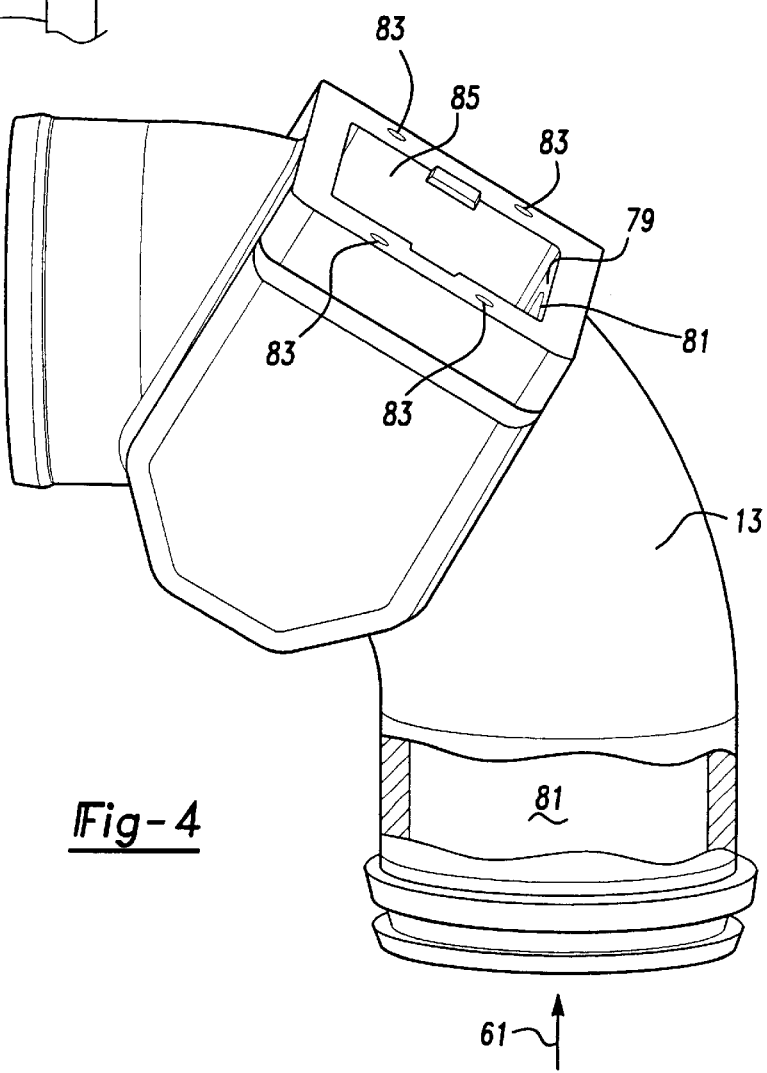
FIG. 4 is a perspective view of an air intake tube.
Figure 3:
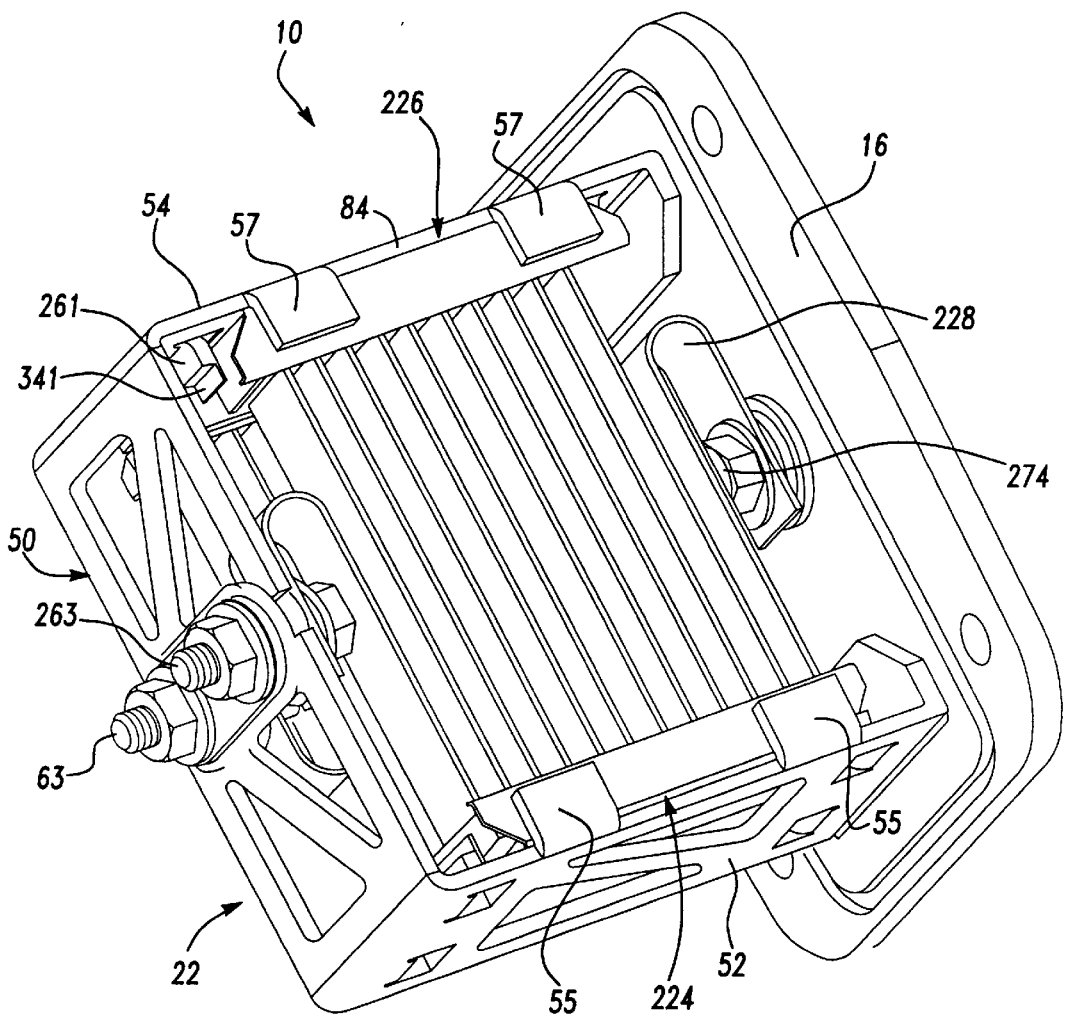
FIG. 3 is a perspective view of the drop-in heater from a different angle.

To assemble drop-in heater 10, first heater module 18 and second heater module 20 are positioned relative to frame 22 and flange 16 as shown in FIG. 2. Fingers 65 and 67 are coupled to frame 22 using a conventional attachment process such as welding, riveting, gluing, or bolting. First heater module 18 and second heater module 20 are positioned within frame 22 whereupon stops 64 and 66 prevent first heater module 18 from moving in the direction of air flow 62 by contacting side walls 34 and 134 of first and second holders 24 and 26. Similarly, second heater module 20 is prevented from traveling axially along the direction of air flow 62 because holders 224 and 226 are in contact with first and second holders 24 and 26. Once first heater module 18 and second heater module 20 are positioned within frame 22, tangs 55 and 57 are folded inwardly to retain the heater modules as shown in FIG. 3. As shown in FIG. 4, air intake tube 13 includes a land 79 that cooperates with an edge 84 (FIG. 2) of frame 22 to further restrict axial movement of the heater modules in a direction opposite to the direction of air flow 62.

A first embodiment of drop-in heater 10 for use in a twelve-volt power system is hereinafter described. Referring to first heater module 18 as shown in FIG. 2, a bolt 63, with appropriate insulating spacer 86, is disposed through a first slot 70 in heating element 28 and a slot 72 in frame 22. In similar fashion, a bolt 74 is disposed through a second slot 76 in heating element 28 and an aperture 78 in flange 16. One skilled in the art will appreciate that second heater module 20 is coupled to flange 16 and frame 22 in a substantially similar manner as first heater module 18. Accordingly, like components have been identified with reference numerals increased by 200.

Drop-in heater 10 may now be handled and/or shipped separately to an end user for assembly into an engine. As shown in FIGS. 1 and 4, air intake tube 13 defines an air passage 81, fastener apertures 83 and a cavity 85. Air heater 10 is positioned within cavity 85 in heat transfer relation to air passage 81. Standard fasteners (not shown) are positioned within flange apertures 17 and fastener apertures 83 to couple flange 16 to air intake tube 13. In addition, flange 16 seals cavity 85 and air passage 81 from the engine compartment and contamination. Those skilled in the art will appreciate that air heater 10 may be positioned at any point along the air induction system and that the location drawn and described is merely exemplary.

Figure 6:
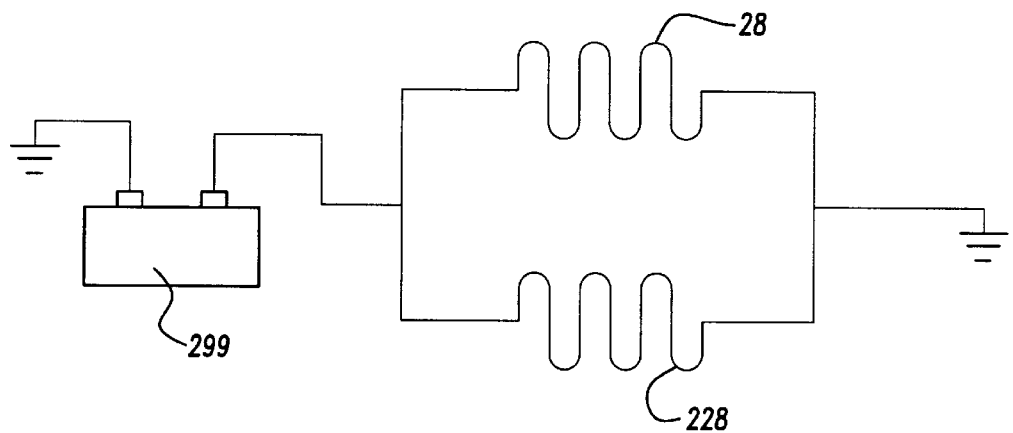
FIG. 6 is an electrical schematic representative of an embodiment of the present invention.

Heating element 28 is formed of an electrically resistant material that generates heat when connected to a power source as hereinafter described. Because the first embodiment of drop-in heater 10 utilizes a twelve-volt power supply 299, heating elements 28 and 228 are electrically connected in parallel as shown in FIG. 6. Accordingly, as best seen in FIG. 2, bolts 63 and 263 are both mechanically and electrically coupled to frame 22 by connecting plate 95 and nuts 80. Frame 22 is electrically coupled to mounting flange 16 which is electrically coupled to ground via the engine of the vehicle. In order to direct the flow of electricity through heating element 28, bolts 74 and 274 are electrically insulated from flange 16 by insulating sleeves 87 and insulating spacers 86. Finally, bolts 74 and 274 are electrically connected to a power source for communicating current to heating element 28.

Figure 5:
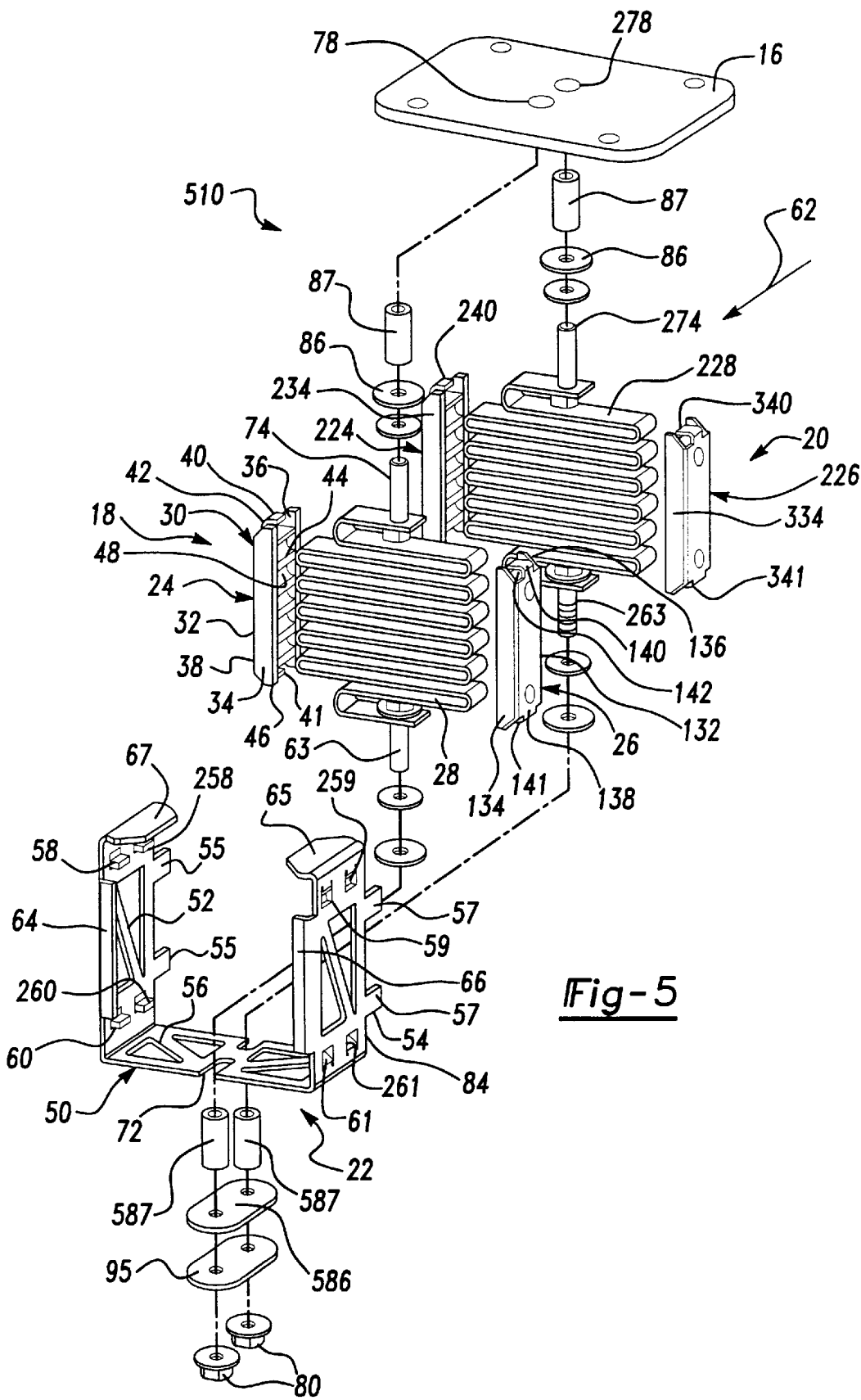
FIG. 5 is an exploded view of a second embodiment of the drop-in heater.

A second embodiment of the present invention constructed to cooperate with a 24 volt power supply is shown in FIG. 5. The function of the components of this embodiment are essentially the same as those previously described in FIGS. 1–4. Accordingly, those skilled in the art will appreciate that drop-in heater 510 provides the advantages previously discussed herein. For clarity, only those components that have been modified or added to create a 24 volt heater begin with numerals increased by 500.

Figure 7:
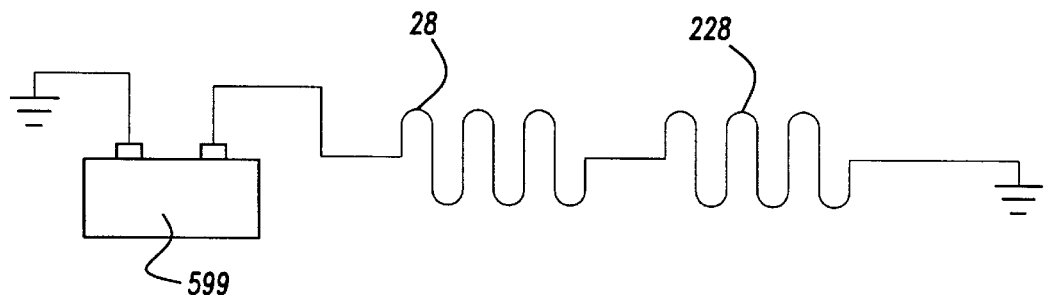
FIG. 7 is an electrical schematic representative of an another embodiment of the present invention.

The 24 volt version of drop-in heater 510 differs from the 12 volt heater in manner of internal electrical connection only. Specifically and in order to utilize a 24 volt power supply 599, heating elements 28 and 228 are electrically connected in series as shown in FIG. 7. Accordingly, both bolt 63 and bolt 263 are electrically coupled to one another but electrically insulated from frame 22. Insulating spacer 586 is positioned between frame 22 and conductive connector plate 95 to accomplish the task of insulating frame 522 while connector plate 95 electrically couples bolts 63 and 263. To complete the series circuit, one of bolts 74 and 274 is electrically connected to power while the other is electrically connected to ground. Each bolt 74 and 274 is electrically insulated from the other and also from flange 16.

One skilled in the art will appreciate that the aforementioned series circuit may be constructed in a variety of ways. For example, instead of insulating both bolts 74 and 274 from flange 16 as shown in FIG. 5, one set of insulators 86 and 87 may be removed from one of the bolts to allow current to ground through flange 16. Accordingly, the only bolt requiring a separate electrical connection would be the positive bolt utilizing the insulators.

What is claimed is:

1. A heater comprising:
a first holder;
a second holder;

a heating element positioned between said first and second holders; and a frame defining a channel, said frame having a plurality of prongs extending inwardly towards said channel; said prongs retaining said first and second holders in a first direction relative to said frame wherein each of said first and second holders includes a pair of tabs wherein each of said prongs biasedly deform said tabs creating a biasing force urging said first holder towards said second holder.

2. The heater of claim 1 wherein said frame includes a bottom, upright side walls defining a direction of air flow, and a stop extending from one of said upright side walls wherein said stop prevents said first and second holders from translating in said direction of airflow.

3. The heater of claim 2 wherein said frame includes a tang extending from one of said upright side walls wherein said tang prevents said first and second holder from translating opposite said direction of air flow.

4. The heater of claim 2 wherein said frame is positioned within an engine; said engine including a land wherein said land prevents said first and second holders from translating opposite said direction of air flow.

5. The heater of claim 1 further comprising a mounting flange coupled to said frame wherein said mounting flange is sealingly coupled to an air intake component of an engine.

6. The heater of claim 5 wherein said air intake component is an air intake tube shaped to form a ninety degree bend.

7. The heater of claim 1 further comprising a third holder, a fourth holder, and a second heating element positioned between said third and fourth holders; said prongs retaining said third and fourth holders in said first direction relative to said frame.

8. The heater of claim 7 wherein said first and second heating elements are electrically connected in series.

9. The heater of claim 7 wherein said first and second heating elements are electrically connected in parallel.

10. An internal combustion engine for use in a vehicle comprising:

an air intake tube defining an air passage; and a heater coupled to the air intake tube in heat transfer relationship with the passage, said heater including a first holder, a second holder, a heating element positioned between said first and second holders, and a frame defining a channel, said frame having a plurality of prongs extending inwardly towards said channel, said prongs retaining said first and second holders in a first direction relative to said frame.

11. The heater of claim 10 wherein each of said first and second holders include a pair of tabs engaging said prongs.

12. The heater of claim 11 wherein each of said prongs biasedly deform said tabs creating a biasing force urging said first holder towards said second holder.

13. A heater comprising:

a first holder;

a second holder;

a heating element positioned between said first and second holders; and a frame defining a channel, said frame having a plurality of prongs extending inwardly towards said channel; said prongs retaining said first and second holders in a first direction relative to said frame, said heater further comprising a mounting flange coupled to said frame wherein said mounting flange is adapted to sealingly couple to an intake component of an engine.

14. The heater of claim 13 wherein said mounting flange includes a generally planar sealing face.

15. The heater of claim 14 wherein said sealing face includes a groove adapted for receiving a seal.

* * * * *